United States Patent
Sitnichenko et al.

[15] 3,639,767
[45] Feb. 1, 1972

[54] PHOTOELECTRIC TRACER COMPRISING TWO LENSES OR APERTURES LOCATED ALONG A COMMON RADIUS FROM AN AXIS OF ROTATION

[72] Inventors: Valentin Mikhailovich Sitnichenko, ulitsa, Odesskaya, 58/16, kv. 14; Alexandr Mikhailovich Zamuruev, ulitsa, Tereshkovoi, 12, kv. 24, both of Odessa, U.S.S.R.

[22] Filed: Sept. 16, 1969
[21] Appl. No.: 858,388

[52] U.S. Cl. ..................... 250/202, 250/219 QA, 250/220 R, 250/237, 318/577
[51] Int. Cl. ................................. G01n 21/30, G06k 11/02
[58] Field of Search .................... 250/202, 219, 220, 237; 318/577

[56] References Cited

UNITED STATES PATENTS 2,853,626    9/1958    Wetzel ................................. 250/202

Primary Examiner—James W. Lawrence
Assistant Examiner—T. N. Grigsby
Attorney—Waters, Roditi, Schwartz & Nissen

[57] ABSTRACT

A photoelectric tracer unit is disclosed for tracing an outline or pattern, and adapted to be incorporated in the photoelectric control apparatus of a work-performing machine, such as a gas-cutting machine and the like, wherein the axes of a pair of modulating means of a modulator member lie in a plane passing through the axis of rotation of this modulator member, to one side of this axis of rotation, whereby this tracer unit is capable of supplying information representing an immediately coming change of the position of the outline being traced in respect of a pair of coordinate axes.

2 Claims, 6 Drawing Figures

PHOTOELECTRIC TRACER COMPRISING TWO LENSES OR APERTURES LOCATED ALONG A COMMON RADIUS FROM AN AXIS OF ROTATION

The present invention relates to photoelectric control apparatus, and, more particularly, it relates to a photoelectric tracer unit for tracing an outline, adapted to be incorporated in the photoelectric control apparatus of a work-performing machine, such as a gas-cutting machine, and the like.

Photoelectric tracer units for tracing an outline, adapted to be incorporated in the photoelectric control apparatus of a work-performing machine, such as a gas-cutting machine, are known. In these known photoelectric tracer units the main light flux and the ancillary light flux carrying information representing, respectively, the immediate position of the outline being traced and an immediately coming change in the position thereof are scanned by a pair of eccentrically positioned modulating means of a rotary modulating member and are then received by a pair of individual photoelectric registering means, e.g., photocells, converting these respective light fluxes into electric signals controlling the operation of the photoelectric control apparatus.

The eccentric arrangement of the modulating means in the above-specified known photoelectric tracer units is provided solely for supplying and receiving information that a change is coming in the position of the outline being traced, but does not supply, however, any information of the relation of this coming change to an accepted pair of coordinate axes.

Moreover, in these known photoelectric tracers the main and the ancillary light fluxes are directly received by corresponding photoelectric registering devices, whereby these respective photoelectric registering devices should be of a different structure for the two fluxes.

It is an object of the present invention to provide a device which overcomes these disadvantages.

The present invention has for its aim the provision of a photoelectric tracer for tracing an outline or pattern, adapted to be incorporated in the photoelectric control apparatus of a work-performing machine, such as a gas-cutting machine, and the like, which is capable of supplying information of the immediately coming change in the position of the outline being traced, in respect of a pair of coordinate axes, and which is adapted to be incorporated in photoelectric control devices having different dynamic characteristics.

This aim is attained in a photoelectric tracer unit for tracing an outline or pattern, adapted to be incorporated in the photoelectric control apparatus of a work-performing machine, such as a gas-cutting machine, and the like, wherein a main light flux and an ancillary light flux, representing, respectively, information of the immediate position of said outline being traced and of an immediately coming change in the position thereof, are scanned by a pair of eccentrically positioned modulating means of a rotary modulator member, said two light fluxes being adapted to be received by the respective individual photoelectric registering devices, adapted to convert said respective light fluxes into electric control signals, used to control the operation of said photoelectric control apparatus.

In accordance with the present invention, in the above-specified photoelectric tracer unit, the respective axes of said pair of modulating means of said modulator member lie in a plane passing through the axis of rotation of said modulator member, to one side of said axis of rotation.

For providing the possibility of use in a photoelectric tracer unit of individual photoelectric registering devices of a similar or identical structure, it is preferable for said tracer unit to comprise means positioned downstream of said modulator member along the path of said two light fluxes, said last-mentioned means being adapted to redirect said main light flux and said ancillary light flux toward their respective individual photoelectric registering devices.

Said means adapted to redirect said main light flux and said ancillary light flux toward their respective individual photoelectric registering devices, according to one preferred embodiment of the present invention, includes a mirror having an opening through the central portion thereof, positioned at an angle in respect of the axes of said pair of modulating means, so that said main light flux alone can pass through said opening.

According to another preferred embodiment of the present invention, said pair of modulating means of said modulator member are in the form of a pair of lenses, said means adapted to redirect said main light flux and said ancillary light flux toward their respective individual photoelectric registering devices including a pair of masking members positioned each at an angle in respect of said axes of said modulating means, each one of said masking members being adapted to intercept that one of said two light fluxes, which is not to be received by the respective one of said photoelectric registering devices, associated with said one masking member.

With a photoelectric tracer unit, constructed in accordance with the present invention, it becomes possible to adjust automatically the tracing speed, and, correspondingly, the operating speed of the tracer-controlled machine, in accordance with the degree of the curvature of the outline being traced, and thus to combine an optimal operational speed of the work-performing machine with high-tracing accuracy, i.e., with a highly accurate treatment of work by this machine.

The present invention will be better understood from the following detailed description of two of its preferred embodiments, with due reference being had to the accompanying drawings, wherein.

Figure 1:
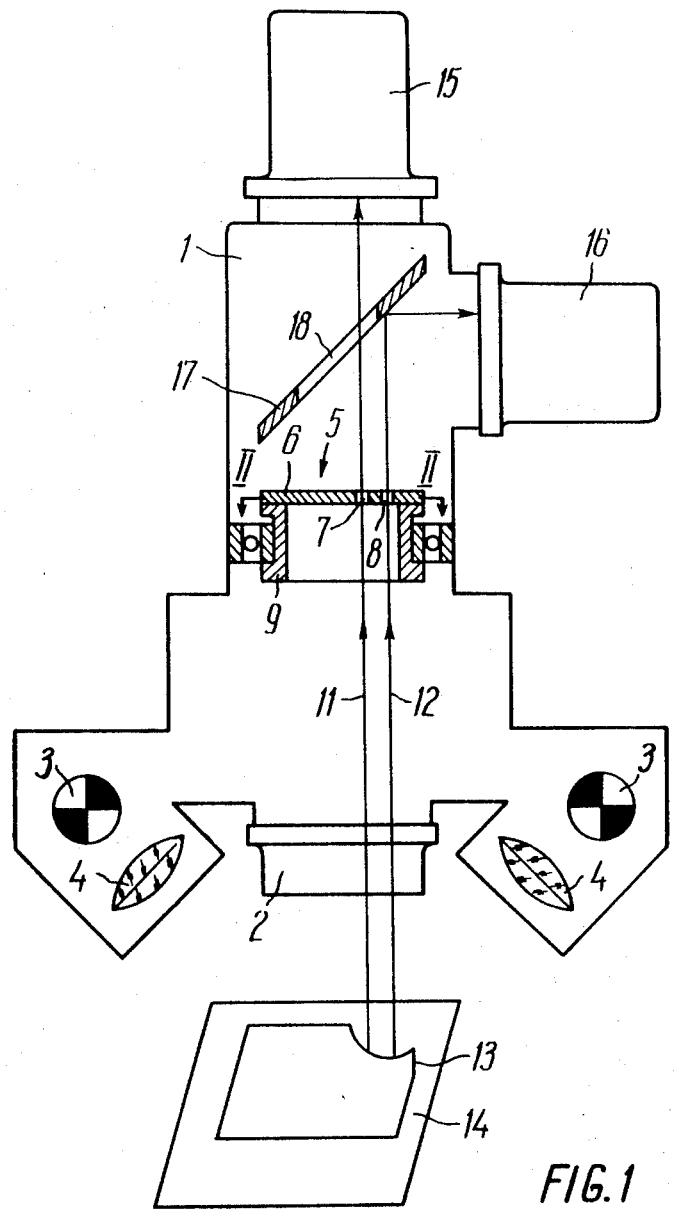
FIG. 1 shows schematically an axial sectional view of a photoelectric tracer unit, embodying the invention.

Referring now in particular to the appended drawings, a photoelectric tracer unit, embodying the present invention, comprises a housing 1 (FIG. 1) supporting an objective lens 2, a pair of illuminating lamps 3 with their respective condensers 4 and a modulator 5 mounted to be driven in rotation from a synchronous motor (not shown), about an axis aligned with the optical axis of the lens 2.

The modulator 5 includes a disc 6 carrying thereon a single pair of modulating means, which latter in the herein described embodiment of the invention are in the form of a pair of apertures 7 and 8, the disc 6 being mounted on the rotor of the synchronous motor (not shown).

Figure 2:
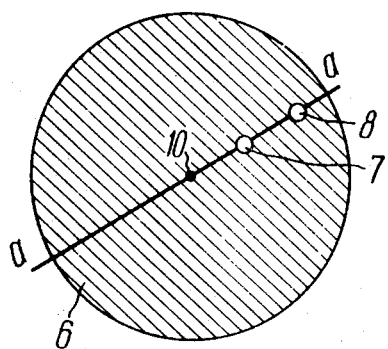
FIG. 2 is a sectional view taken along line II—II of FIG. 1.

The geometrical axes of the respective apertures 7 and 8 are offset from the axis of rotation 10 (FIG. 2) of the modulator 5, to one side of this axis of rotation 10, and the apertures lie in a plane passing through this axis of rotation. This plane intersects the disc 6 of the modulator along line "aa" (FIG. 2).

With the modulator 5 being rotated in operation, its two apertures 7 and 8 are scanning, respectively, the main light pencil of flux 11 (FIG. 1) and the ancillary one 12, which two light pencils or fluxes carry information representing, respectively, the immediate position of the outline or contour 13 of the drawing or pattern 14 being traced, and the immediately coming position of this outline or contour 13 (in other words, the coming change in the position of the outline 13 being traced).

Downstream of the modulator 5, along the path of the light fluxes 11 and 12, there is positioned a means for redirecting the main light flux 11 and the ancillary one 12 toward their respective individual photoelectric registering devices, e.g., photocells 15 and 16. In the herein described embodiment of the photoelectric tracer, constructed in accordance with the invention, the last-mentioned means is in the form of a mirror 17 having an opening 18 through the central portion thereof, the mirror being at an acute angle with respect to the axes of the apertures 7 and 8 and so positioned, that the main light flux 11 alone is able to pass through the opening 18 toward its respective photocell 15. The incorporation of the mirror 17 in the herein described photoelectric tracer unit provides for employing photoelectric registering devices, e.g., photocells 15 and 16, of a similar structures for both light fluxes, i.e., for the main one 11 and the ancillary one 12.

Figure 3:
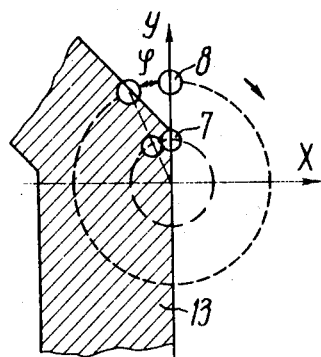
FIG. 3 is a general schematic illustration of a photoelectric tracer unit according to another embodiment of the present invention.
Figure 3:
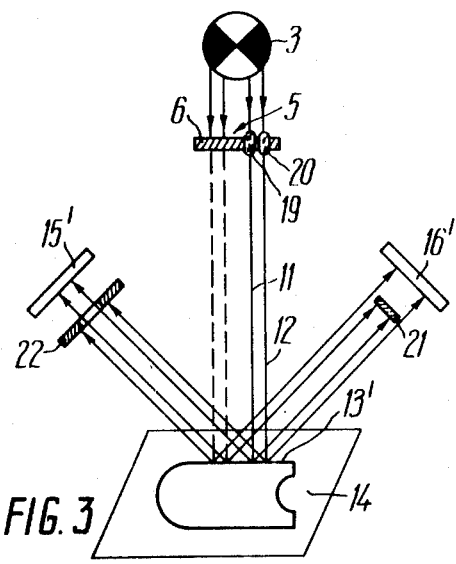

In another embodiment of the present invention, illustrated in FIG. 3, the pair of the modulating means of the modulators 5 are in the form of lenses 19 and 20 having their axes offset from the axis of rotation of the modulator 5, to one side of this axis. According to this embodiment, the means for redirecting the main light flux 11 and the ancillary one 12 toward their respective registering photocells 15' and 16' is in the form of a pair masking members 21 and 22 each set at an angle with respect to the optical axes of the lenses 19 and 20.

A photoelectric tracer unit, constructed in accordance with the first-described embodiment of the present invention (FIG. 1), operates, as follows.

Light falling from the illuminating lamps 3 through the condensers 4 upon the outline or contour 13 being traced is reflected thereby, and arrives through the objective lens 2 onto the modulator 5 rotated by a synchronous motor (not shown). The main light flux 11 which carries, as it has been already stated, information representing the immediate position of the outline 13 being traced, is scanned by the aperture 7 of the modulator 5 and is directed onto the photoelectric registering device, i.e., photocell 15 through the central opening 18 in the mirror 17. The ancillary light flux 12 carrying information representing the coming change in the position of the outline 13 being traced is scanned by the aperture 8 of the rotating modulator 5 and is reflected by the unapertured portion of the mirror 17 upon the respective registering photocell 16. Since the accuracy of operation of photoelectric tracing apparatus depends on the width of the tracing area, the spacing between the axis of rotation 10 of the modulator 5 and the center of the aperture 7 is selected in accordance with a desired tracing accuracy, whereas the spacing between the axis of rotation 10 of the modulator 5 and the center of the aperture 8 is selected to correspond to the relevant dynamic characteristics of the tracing apparatus in question (since these dynamic characteristics of the photoelectric tracing apparatus and of the work-performing machine controlled thereby should be considered when determining a desired rate of automatic speed control at tracing curved areas of the outline 13, as well as permissible accelerations and decelerations at tracing angular portions of the outline 13).

Figure 6:
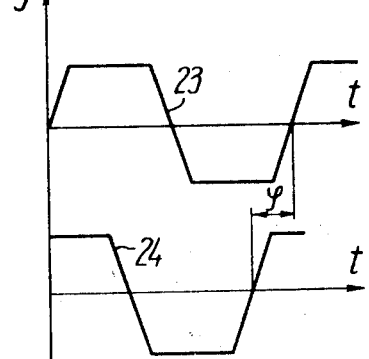
FIG. 6 is similar to FIG. 4, with the outline being traced changing its position to the left of the coordinate axes.
Figure 4:
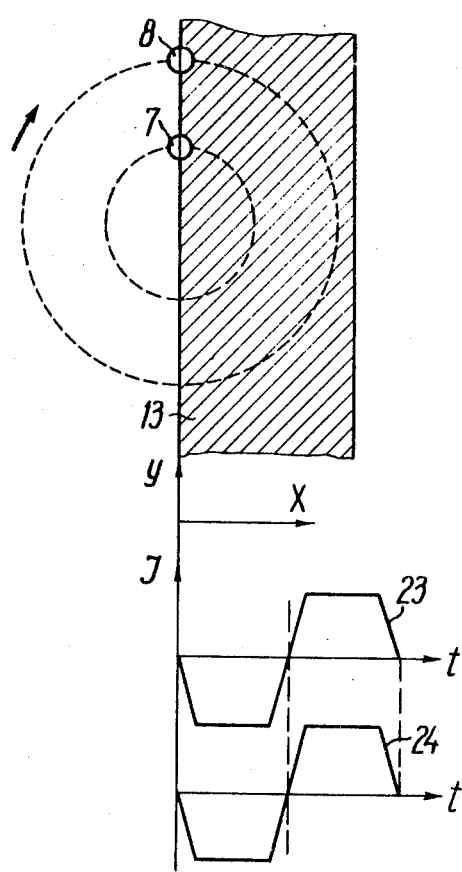
FIG. 4 shows the registered positions of the main and ancillary light fluxes, received when a photoelectric tracer unit, embodying the invention, traces a rectilinear portion of the outline, and the corresponding electric signals sent by the photoelectric registering devices.
Figure 5:
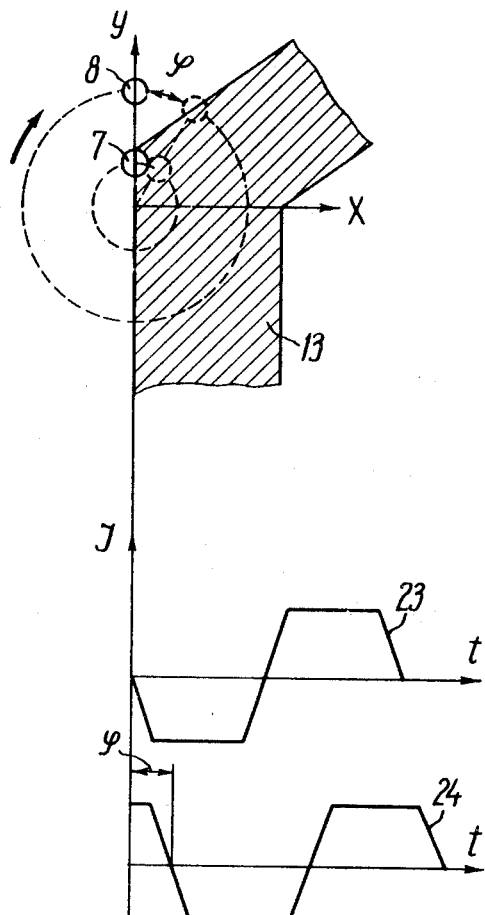
FIG. 5 is similar to FIG. 4, with the outline being traced changing its position to the right of the coordinate axes.

There will next be described in more detail the operation of the photoelectric tracer unit, upon tracing the position of the outline 13 in respect to a pair of coordinate axes $x$ and $y$ (FIGS. 4, 5, 6).

Shown in FIG. 4 is the case when a rectilinear portion of the outline 13, parallel to the coordinate axis $y$, is being traced. The light orbit produced by the aperture 7 at its rotation is received at appropriate moments by the photoelectric registering device 15 which generates a main signal 23 (in FIGS. 4, 5, 6 the signal 23 is related to time $t$ and current "I"); whereas the light orbit produced by the rotation of the aperture 8 is received, also at corresponding moments, by the photoelectric registering device 16 which generates an ancillary signal 24 (also related to time and current in FIGS. 4, 5, 6). In the case shown in FIG. 4 there is no phase shift between the signals 23 and 24, and the tracing apparatus, as well as the machine controlled thereby, operate at a set working speed.

Illustrated in FIG. 5 is a tracing operation, when the outline 13 being traced is going to change its position to the right in respect to the coordinate axis $y$, while FIG. 6 illustrates the case when the outline 13 being traced will be presently displaced to the left in respect to the coordinate axis $y$. In both cases there appears a phase shift through an angle $\phi$ between the signals 23 and 24 (quite obviously, the direction of this shift is opposite in the cases illustrated in FIGS. 5 and 6), which phase shift is utilized for automatically adjusting the tracing speed in a corresponding manner.

The operation of the embodiment of a photoelectric tracer unit, constructed in accordance with the invention and illustrated in FIG. 3 of the appended drawings, is basically similar to that of the previously described embodiment, illustrated in FIG. 1.

Placed upon the outline 13' (FIG. 3) being traced are two light orbits, concentric about the axis of rotation of the modulator 5, coming, respectively, from the lenses 19 and 20 of the modulator 5 positioned intermediate the light source 3 and the outline 13', as the modulator 5 is rotated by a synchronous motor (not shown). The main light flux 11 is reflected by the outline 13' and is received by the photoelectric registering device 15', while the ancillary light flux 12 is reflected also by the outline 13' and is received by the photoelectric registering device 16', with the masking member 21 intercepting that portion of the total light flux reflected toward the device 16', which corresponds to the main light flux 11, while the masking member 22 intercepts that portion of the total light flux reflected toward the device 15', which corresponds to the ancillary light flux 12.

The respective spacing between the optical axes of the lenses 19 and 20 and the axis of rotation of the modulator 5 is selected to correspond to a desired tracing accuracy and to the dynamic characteristics of the tracing apparatus and the machine controlled thereby, as it has been already described above.

In both above-described embodiments of the present invention, the photoelectric registering devices 15 and 16, 15' and 16' convert the respective light fluxes into an alternating electric current whose frequency is defined by the rotational speed of the modulator 5, whereas the phase of one of the constituent undulations thereof represents the inclination of the portion of the outline 13 (13'), which is to be immediately traced, in respect of the chosen system of coordinates.

The incorporation of the herein disclosed photoelectric tracer unit in a tracer-controlled gas-cutting machine brings about optimization of the operation of such machine, since it provides for producing control signals for smooth automatic adjustment of the speed of the cutting operation, in accordance with the degree of curvature of the outline being immediately traced, and thus makes it possible to perform the cutting operation at a maximal speed for a given thickness of the workpiece being treated, and to reduce this speed smoothly, according to the curvature of the portion being cut. However, the conditions of such optimization of the cutting operation call for different modes of speed adjustment, when approaching a curved portion of the outline being traced and when approaching an angularly bent portion thereof. With a photoelectric trader unit, constructed in accordance with the present invention, this problem can be solved by comparing continuously the phase data of the main and ancillary signals, and, should the phase shift therebetween exceed a preset value, by adjusting the speed of the corresponding actuating mechanisms of the tracing apparatus and of the machine controlled thereby in an appropriate manner (the same is true not only of the angularly bent portions of the outline being traced, but also of the portions thereof having a sufficiently small curvature radius). Thus, it becomes possible to combine optimally high-cutting speeds with a desired accuracy of the tracing operation, and also to increase the reliability of the performance of tracer-controlled gas-cutting machines and make them serve longer and better.

Moreover, the herein disclosed photoelectric tracer unit is also capable of responding to additional information, e.g., that pertaining to the control of other parameters of the cutting operation. This can be attained by placing additional lines or other appropriate markings adjacent to the outline being traced, to be read out by the light orbit of the ancillary signal flux, and to be further interpreted in any known appropriate manner.

What we claim is:

1. A photoelectic tracer unit for tracing an outline, adapted for use in photoelectric control apparatus, said unit comprising: a housing; a lens located within said housing to magnify the width of a line of an outline being traced; a light source accommodated within said housing to illuminate said outline; a modulator accommodated within said housing for rotation about an axis and provided with two orifices located on a common radius in a plane passing through the axis of rotation of said modulator on one side thereof to separate main and ancillary light fluxes which carry information about the position of the outline and about the coming change in the curvature thereof, respectively; a mirror with a central orifice, said mirror being disposed within said housing at an angle to the axes of said orifices of said modulator such that only the main flux passes through said central orifice whereas the ancillary light flux is reflected therefrom; and individual photoelectric cells respectively in the path of the main and ancillary light fluxes after passage thereof beyond the modulator for converting said light fluxes into electric signals to control actuating mechanisms of the photoelectic control apparatus.

2. A photoelectric tracer unit for tracing an outline, adapted for use in photoelectric control apparatus, said unit comprising: a housing; a light source accommodated within said housing to illuminate lines of an outline being traced; a modulator accommodated within said housing for rotation about an axis and including two modulating elements in the form of positive lenses located on a common radius in a plane passing through said axis of rotation of the modulator on one side thereof to separate main and ancillary light fluxes carrying information about the position of the outline and about the coming change in the curvature thereof; individual photoelectric cells located within said housing for receiving respective main and ancillary light fluxes for converting said light fluxes into electric signals to control actuating mechanisms of the photoelectric control apparatus; and two shutters in said housing each at an angle of 45° with respect to the axis of rotation of the modulator, one of said shutters having a central orifice for passing only the main light flux reflected from the line of the outline being traced to one of said respective individual photoelectric cells and the other shutter being constructed to prevent the main light flux from striking the other of said individual photoelectric cells and to pass the ancillary light flux to said other individual photoelectric cell.

* * * * *